(12) United States Patent
Satou

(10) Patent No.: US 7,898,293 B2
(45) Date of Patent: Mar. 1, 2011

(54) CIRCUIT BOARD, INFORMATION PROCESSING APPARATUS, AND TRANSMISSION METHOD

(75) Inventor: Takuya Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/230,327

(22) Filed: Aug. 27, 2008

(65) Prior Publication Data

US 2008/0317164 A1 Dec. 25, 2008

Related U.S. Application Data

(63) Continuation of application No. PCT/JP2006/303637, filed on Feb. 27, 2006.

(51) Int. Cl.
*H03K 19/0175* (2006.01)
*H03K 3/00* (2006.01)
*H03B 1/00* (2006.01)

(52) U.S. Cl. .......................... 326/82; 327/108
(58) Field of Classification Search ....................... None
See application file for complete search history.

(56) References Cited

U.S. PATENT DOCUMENTS 5,742,832 A * 4/1998 Buxton et al. ................ 713/322
6,772,250 B2 * 8/2004 Dreps et al. ................. 710/100
7,342,508 B2 * 3/2008 Morgan et al. ............ 340/870.1
2002/0080883 A1 * 6/2002 Tamura et al. .............. 375/257

FOREIGN PATENT DOCUMENTS

| JP | 11239049 | 8/1999 |
| JP | 2002094365 | 3/2002 |
| JP | 2004228613 | 8/2004 |
| WO | 03/084161 | 10/2003 |

* cited by examiner

*Primary Examiner*—Vibol Tan
*Assistant Examiner*—Dylan White
(74) *Attorney, Agent, or Firm*—Staas & Halsey LLP

(57) ABSTRACT

One aspect of the invention is directed to the provision of a circuit board mounted with a plurality of circuit components connected via a transmission line. The circuit components mounted on the circuit board includes at least a signal processor for processing a signal, a driver for transmitting the signal, and a receiver for receiving the signal. The driver includes a basic buffer, which is always on, and at least one control buffer, which can be individually controlled on and off, and which is connected in parallel with the basic buffer, and the output impedance of the basic buffer is set higher than the characteristic impedance of the transmission line.

7 Claims, 7 Drawing Sheets

Fig.3

| A | B | -EN1 | |
|---|---|---|---|
| 0 | 0 | 1 | |
| 0 | 1 | 0 | BUFFER 32 IS DRIVEN |
| 1 | 0 | 0 | BUFFER 32 IS DRIVEN |
| 1 | 1 | 1 | |

Fig.4

| A | B | C | ENOR21 | ENOR22 | -EN1 | -EN2 | |
|---|---|---|---|---|---|---|---|
| 0 | 0 | 0 | 1 | 1 | 1 | 1 | |
| 0 | 0 | 1 | 1 | 0 | 1 | 1 | |
| 0 | 1 | 0 | 0 | 1 | 0 | 1 | ×2 |
| 0 | 1 | 1 | 0 | 0 | 0 | 0 | ×3 |
| 1 | 0 | 0 | 0 | 0 | 0 | 0 | ×3 |
| 1 | 0 | 1 | 0 | 1 | 0 | 1 | ×2 |
| 1 | 1 | 0 | 1 | 0 | 1 | 1 | |
| 1 | 1 | 1 | 1 | 1 | 1 | 1 | |

| | EYE PATTERN WINDOW (PICOSECONDS) | | VOLTAGE (V) | |
|---|---|---|---|---|
| | HIGH SIDE | LOW SIDE | HIGH SIDE | LOW SIDE |
| A | 1134 | 1148 | 1.413 | 0.3793 |
| B | 1057 | 1069 | 1.486 | 0.314 |
| DIFFERENCE | 77 | 79 | | |

CIRCUIT BOARD, INFORMATION PROCESSING APPARATUS, AND TRANSMISSION METHOD

CROSS REFERENCE TO RELATED APPLICATION

This application is a continuation application and is based upon PCT/JP2006/303637, filed on Feb. 27, 2006.

TECHNICAL FIELD

One aspect of the present invention relates to a circuit board that enables high-speed transmission of signals between circuit components mounted thereon, an information processing apparatus having at least one such circuit board, and a method for transmitting signals between circuit components.

BACKGROUND ART

In recent years, the signal processing speed of information processing apparatus, such as servers has been increasing, and there has developed a need to further increase signal transmission speed on circuit boards. To increase the signal transmission speed, the signal transmission frequency must be increased; however increasing the transmission frequency may also result in increasing the signal transmission loss to a non-negligible level even if signals were transmitted over the same distance as before.

For example, in the wiring on a circuit board in a server, as the operating frequency increases, the transmission loss of high-frequency components, due to skin effect, etc., increases to an appreciable level, and the sharpness of signal edges is lost, resulting in a degradation of the received signal level at the receiver end. The degradation of the signal level at the receiver end results in reduced resistance to signal noise and reduced timing margin.

To address this problem caused by the degradation of the signal level at the receiver end, there is proposed a parallel buffer driver comprising a plurality of buffers in parallel (refer to patent document 1). The proposed driver circuit turns on or off the respective parallel buffers according to the signal change pattern, thereby increasing the driving capability of the driver to compensate for the high-frequency transmission loss of signals.

However, as the frequency increases, a slight clock drift can make accurate signal sampling impossible.

Patent document 1: WO2003/084161

SUMMARY

In view of the above problem, it is an object of the present invention to provide a circuit board mounted with circuit components designed so as to widen data eye pattern opening while making high-speed data transmission possible, and also provide an information processing apparatus and a transmission method that achieves high-speed data transmission and the widening of the data eye pattern opening at the same time.

Means for Solving the Problem

To achieve the above object, according to a first mode of the present invention, there is provided a circuit board mounted with a plurality of circuit components connected via a transmission line, wherein a driver unit contained in the circuit components and having the function of transmitting a signal includes a basic buffer which is always on and at least one control buffer which can be individually controlled on and off and which is connected in parallel with the basic buffer, and the output impedance of the basic buffer is set higher than the characteristic impedance of the transmission line.

According to a second mode of the present invention, there is provided an information processing apparatus comprising at least one circuit board mounted with a plurality of circuit components connected via a transmission line, wherein a driver unit contained in the circuit components includes a basic buffer, which is always on and at least one control buffer, which can be individually controlled on and off and which is connected in parallel with the basic buffer, and the output impedance of the basic buffer is set higher than the characteristic impedance of the transmission line.

According to a third mode of the present invention, there is provided a method of transmission between a driver circuit and a receiver circuit via a transmission line, wherein the output impedance of an always-on basic buffer in the driver circuit is set higher than the characteristic impedance of the transmission line, a delayed signal is generated by delaying an input signal to the driver circuit, the delayed signal is compared with the input signal, and an output signal is transmitted to the receiver circuit by controlling the control buffer based on the result of the comparison.

EFFECT OF THE INVENTION

According to the present invention, not only can the transmission speed of signals between the circuit components mounted on the circuit board be increased, but by adjusting the output impedance of the basic buffer as described in the present invention, the width of the eye pattern window can be increased; as a result, the noise resistance of the clock can be increased, thus ensuring stable transmission timing.

BRIEF DESCRIPTION OF THE DRAWINGS

FIG. 3 is a truth table showing the operation of a control buffer in the output unit.

FIG. 4 is a truth table showing the operation of another control buffer in the output unit.

DETAILED DESCRIPTION OF THE PREFERRED EMBODIMENT

A driver circuit according to an embodiment of the present invention will be described below with reference to the drawings.

Figure 1:
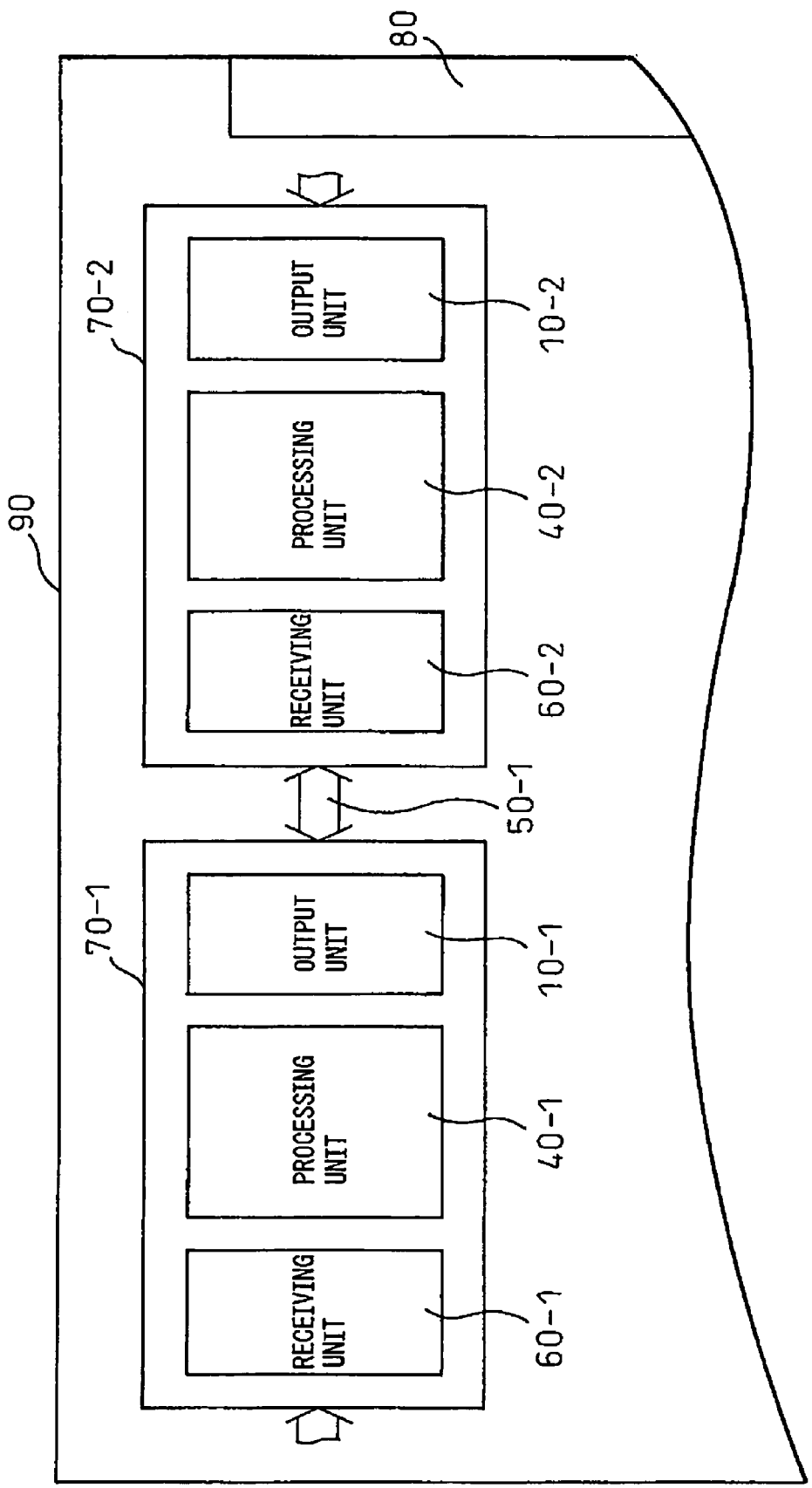
FIG. 1 is a diagram showing a circuit board or an information processing apparatus according to one embodiment of the present invention.

FIG. 1 is a schematic diagram of a printed circuit board mounted with a plurality of LSIs (Large Scale Integration chips) according to the embodiment of the present invention. At least a plurality of LSIs, i.e., LSI 70-1 and LSI 70-2, as circuit components, are mounted on the circuit board 90. The LSI 70-1 contains a signal receiving unit 60-1, a signal processing unit 40-1, and a signal output unit 10-1, and likewise, the LSI 70-2 contains a signal receiving unit 60-2, a signal processing unit 40-2, and a signal output unit 10-2. The LSI 70-1 and the LSI 70-2 are connected via a transmission line 50-1 printed on the circuit board, and signals are transferred between the signal output unit and the signal receiving unit. The circuit board 90 is provided with a connector 80 which can be connected to another connector.

The printed circuit board 90 accommodates an LSI, memory, etc., that function as at least one information processor, and can constitute by itself an information processing apparatus 90. It is also possible to construct an information processing apparatus by connecting a plurality of, for example, four printed circuit boards 90 via connectors 80.

Figure 2:
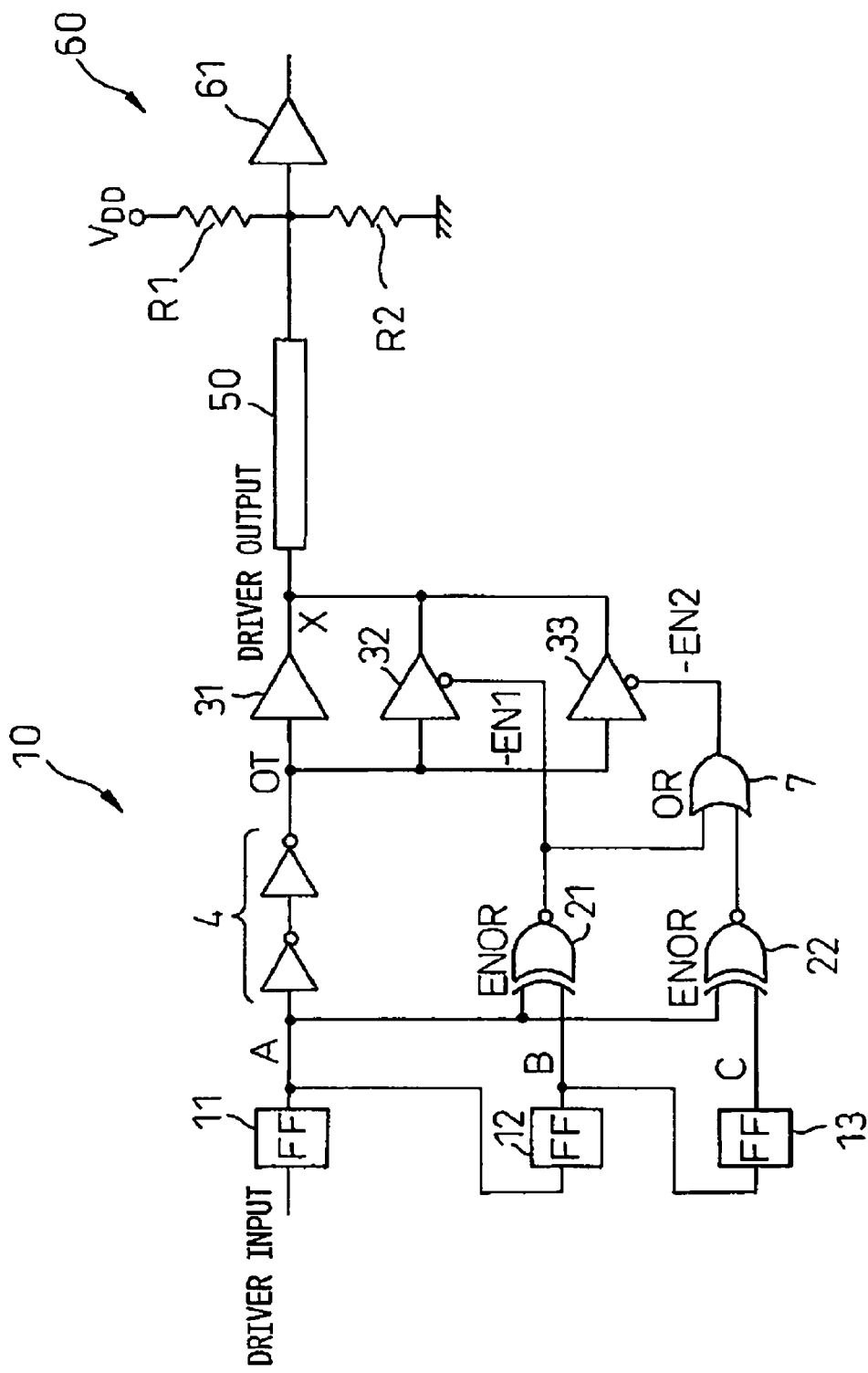
FIG. 2 is a diagram showing circuits in the output unit and receiver unit accommodated on the circuit board.

FIG. 2 is a diagram schematically showing the circuit configuration of an output unit 10 in one LSI and an input unit 60 in another LSI connected via a transmission line 50 on the same circuit board.

The output unit 10 is constructed from a driver circuit comprising three buffers 31, 32, and 33 in parallel. The buffer 31 is a basic buffer capable of operating all the time. The buffer 32 is a control buffer controlled by a control signal –EN1, while the buffer 33 is a control buffer controlled by a control signal –EN2. The output of the driver circuit is produced by turning on or off the respective parallel control buffers, thereby varying the output impedance of the driver.

An input signal to the driver circuit is supplied to an FF 11 formed from a D-flip-flop. The D-flip-flop, which operates each time a clock pulse (not shown) is applied, has the function of holding data for one cycle period. Therefore, the input signal appears at the output of the FF 11 one cycle later as input signal data A. The data A passes through a delay time adjusting device 4, and is supplied as a signal OT to the buffers 31, 32, and 33.

The input signal data A is also supplied to an FF 12 formed from a D-flip-flop, and the data is further delayed by one cycle by the FF 12 and appears at the output as input signal data B. The input data B is supplied to an FF 13 formed from a D-flip-flop, and the data is further delayed by one cycle and appears at the output as input signal data C.

The buffer 32 is controlled by the control signal –EN1 output from an exclusive-NOR circuit ENOR 21. The ENOR 21 takes as inputs the input data A and the data B one cycle back from the input data A.

If the data A and data B input to the ENOR 21 match each other, the control signal –EN1 is set to 1, and therefore the driver 32 is not driven. If the data A and data B do not match, the control signal –EN1 is set to 0, and therefore the driver 32 is driven.

The buffer 32 is driven by the control signal –EN2 output from an OR circuit 7, i.e., by the OR of the outputs of the exclusive-NOR circuits ENOR 21 and ENOR 22. The exclusive-NOR circuit ENOR 22 takes as inputs the input data A and the data C two cycles back from the input data A. If the data A and data C input to the ENOR 22 match each other, the output of the ENOR 22 is set to 1. If the data B and data C match each other but neither matches the data A, the control signal –EN2 is set to 1; on the other hand, if either the data B or data C matches the data A, the control signal –EN2 is set to 0. The buffer 33 is controlled by referring to the data two cycles back in addition to the data one cycle back. As the data changes, selection can be made between the case where the driving capability of the driver circuit is increased to three times and the case where the driving capability is limited to twice the normal capacity by stopping the operation of the third driver 33. Thus performing the control by referring to the data two cycles back, it becomes possible to suppress waveform disturbances that can occur when the driving capability is increased to three times.

The receiver circuit 60 connected to the driver circuit 10 via the transmission line 50 is provided with a termination resistance matched to the characteristic impedance of the transmission line in order to suppress the reflection of the signal being received via the transmission line. The termination resistance provided in the present embodiment is a Thevenin termination comprising a resistor R1 connected between signal line and supply voltage and a resistor R2 connected between signal line and ground. A buffer 61 is a buffer for providing the signal to the stage that follows the receiver circuit.

In the present embodiment, the driver is shown as comprising three buffers connected in parallel, but this configuration is only illustrative, and the number of parallel-connected buffers necessary to carry out the invention is not limited to three, the only requirement being that two or more buffers be provided.

FIG. 3 shows a truth table for the enable signal –EN1 which is output as the control signal to the buffer 32. An exclusive-NOR circuit outputs a 1 if the inputs match, and a 0 if the inputs do not match. If the data A and data B do not match, the ENOR 21 sets the enable signal –EN1 to 0 and drives the buffer 32.

FIG. 4 shows a truth table for the enable signal –EN2 which is output as the control signal to the buffer 33. The operation of the enable signal –EN1 is also shown in FIG. 4. ENOR 21 indicates the exclusive NOR of the data A and data B, and ENOR 22 indicates the exclusive NOR of the data A and data C. The enable signal –EN1 is the output of the ENOR 21, and the enable signal –EN2 is the OR of the outputs of the ENOR 21 and ENOR 22.

"x3" indicates the case where both of the parallel drivers 32 and 33 are driven, thus increasing the driving capability to three times to emphasize the output, and "x2" indicates the case where the parallel driver 32 is driven, but the parallel driver 33 is not driven, thereby limiting the driving capability to twice the normal capability.

Figure 5:
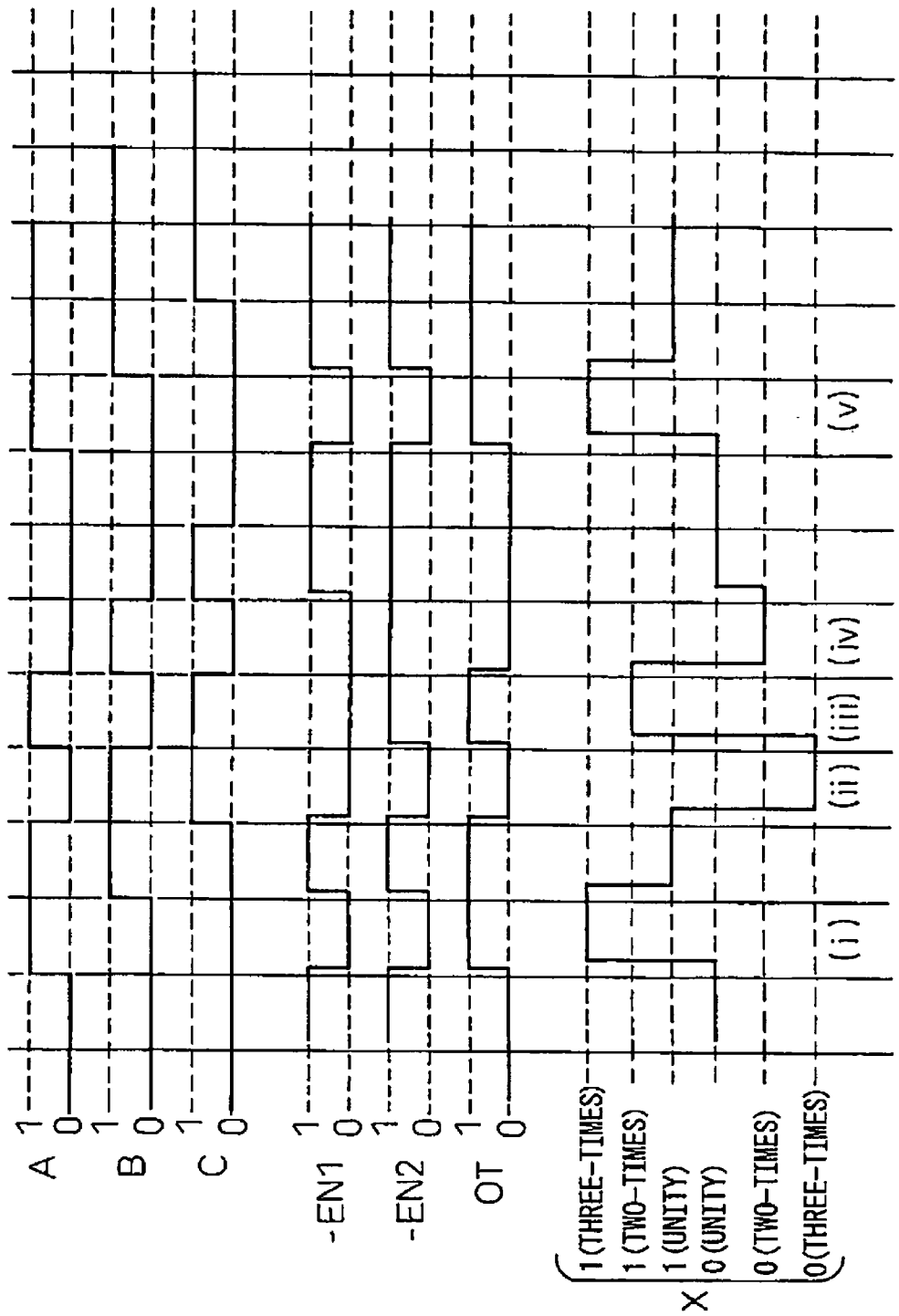
FIG. 5 is a time chart illustrating the operation of the output unit.

FIG. 5 is a diagram explaining how the output of the driver circuit changes with the signal input to the driver circuit. When data A such as shown in FIG. 5 is input, data produced by delaying the data A by one cycle is output as data B, and data produced by delaying the data A by two cycles is output as data C.

As described above, the enable signal –EN1 is the output of the ENOR 21, and the enable signal –EN2 is the OR of the outputs of the ENOR 21 and ENOR 22. OT is the data obtained by passing the data A through the delay time adjusting device, as shown in FIG. 2.

In cycles (i), (ii), and (v), since the enable signals –EN1 and –EN2 are both at 0, both of the parallel drivers 32 and 33 are driven, so that the driving capability is three times the normal capability.

In cycles (i), (ii), and (v), the current data OT does not match data B one cycle back, and also, the current data OT does not match the data C two cycles back. This means that the input signal remains unchanged during the previous two cycles, but changes in the current cycle. In cycles (iii) and (iv), the enable signal –EN1 is at 0, but the enable signal –EN2 is at 1. Therefore, the parallel driver 32 is driven, but the parallel driver 33 is not driven, so that the driving capability is limited to two times the normal capability. In cycles (iii) and (iv), when the current data OT does not match the data B one cycle back but the current data OT matches the data C two cycles back. This means that the input signal changes from one cycle to the next.

Figure 6:
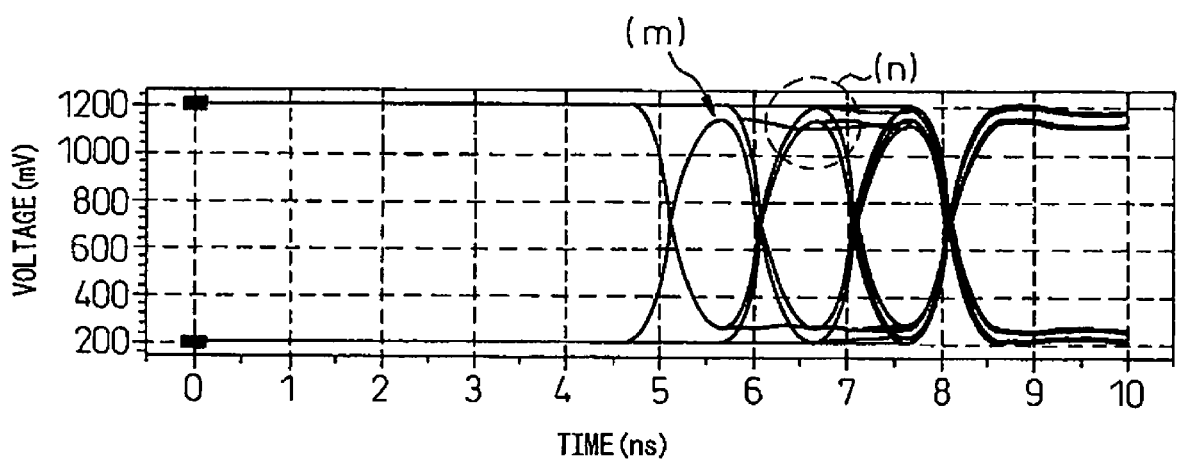
FIG. 6 is a diagram showing an eye pattern for an output signal being output from the output unit.

FIG. 6 shows the result of simulation performed with the driver circuit of FIG. 1.

The result is obtained by sequentially inputting 16 four-bit combinations 0000 to 1111 as input signals and by overlaying the resulting waveforms. The observation point is the point at which the transmitted signal passed through the transmission line enters the receiver.

In this simulation, the transmission line is assumed to be 45 cm long, and in the waveform diagram, the ordinate represents the voltage plotted with 200 mV/div., and the abscissa represents the time plotted with 1 ns/div. According to the simulation result shown in FIG. 6, the initial amplitude (m) of the output signal does not decrease, and fluctuations of the waveform in the horizontal and vertical directions are reduced. Further, as shown in (n) in FIG. 6, the vertical fluctuations of the amplitude are reduced. This is because, for the last 1 in the data code sequence, the driving capability is not increased to three times but limited to twice the normal capability. In this way, when the data changes from one cycle to the next, the performance of the driver circuit can be enhanced by performing control by referring not only to the data one cycle back but also to the data two cycles back.

Signal H ("1") and L ("0") in the data sequence are discriminated by reading the voltage at the rising edge of the clock. However variation of the clock rise position is unavoidable because of variations in the characteristics of the device used or LSI manufacturing variations and because of the applied voltage and ambient temperature. An eye pattern window shows the variation range of the clock. The eye pattern window defines the voltage level with which signal H and L can be discriminated. When the width of the eye pattern window is large, even if the clock varies, the clock will stay within the window. Accordingly, it is desirable to increase the window width for stable circuit operation. Note that voltage level of the clock, which defines the window width of the clock, is set by checking the operation of the actual circuit and by considering noise resistance, etc.

The present inventor noted the DC level of the data signal in the circuit of FIG. 2, and discovered that the output impedance of the basic buffer 31 was small compared with the termination resistance value at the receiver end, and the difference between the DC voltages at the signal H and L sides was relatively large, causing a reduction of the width of the data eye pattern.

In the prior art, the output impedance of the basic buffer 31 was set to about 50Ω and thus matched to the characteristic impedance of the transmission line. On the other hand, the termination resistance at the receiver end was chosen to be 70Ω which was a little larger than 50Ω. In other words, in FIG. 2, R1=R2=140Ω. The reason that the output impedance of the basic buffer 31 was set to 50Ω was that the basic buffer 31 would have to be operated by itself, if the control of the buffers 32 and 33 failed; to provide for such a case, the output impedance of the basic buffer 31 was matched to the characteristic impedance of the transmission line.

In the present embodiment, the output impedance of the basic buffer 31 is set to 80Ω, a value larger than the characteristic impedance 50Ω of the transmission line, and the difference between the DC voltages at the signal H and L sides is closed thereby increasing the width of the data eye pattern window.

Figure 7:
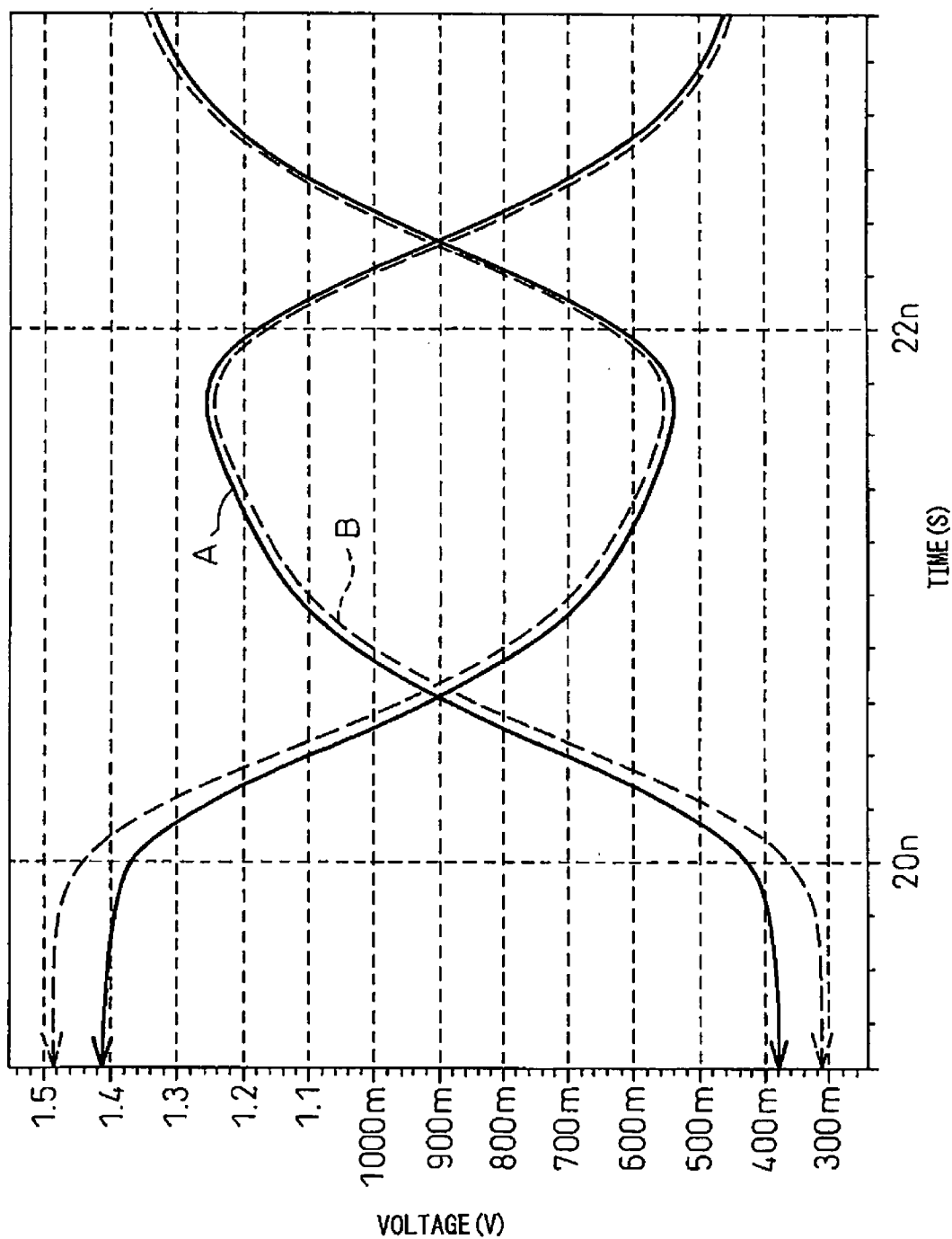
FIG. 7 is a diagram showing an eye pattern for an output signal in the present embodiment in comparison with an eye pattern for an output signal in a comparative example.

FIG. 7 shows the data transmission simulation waveform according to the present embodiment and that of a comparative example. The settings are the same as those in the prior art, except that the output impedance of the basic buffer 31 is set to 80Ω in the present embodiment. That is, the output impedance of each of the buffers 32 and 33 is 25Ω, and the termination resistance at the receiver end is 70Ω. In the comparative example, the output impedance of the basic buffer 31 is set to 50Ω and the others are the same with the present embodiment. The simulation result of FIG. 7 was performed by sequentially inputting 16 four-bit combinations 0000 to 1111 as input signals and by overlaying the obtained waveforms. The observation point is the point at which the transmitted signal passed through the transmission line enters the receiver.

In FIG. 7, the eye pattern in the present embodiment is indicated by A, and the eye pattern in the comparative example is shown by B. The upper and lower values of the eye pattern window are about 1.11 V on the H side and about 690 mV at the L side. As can be seen from FIG. 7, in the present embodiment, the voltage at the H side decreases and the voltage at the L side increases, but the width of the eye pattern window increases.

Figure 8:
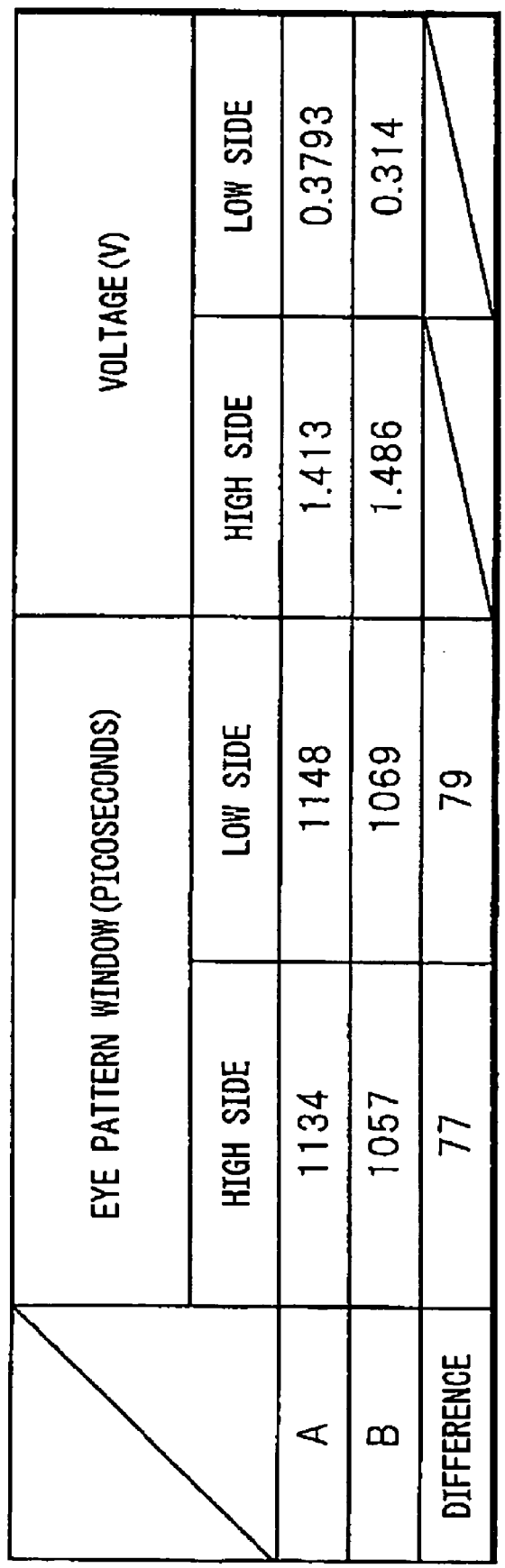
FIG. 8 is a diagram showing the result of the comparison of the eye patterns.

The result is shown in FIG. 8. The width of the eye pattern window in the present embodiment A is increased by 77 picoseconds at the H side and by 79 picoseconds at the L side, compared with the comparative example B. This increase in the width of the eye pattern window shows that an output circuit tolerant of clock variations has been obtained.

The output impedance of the basic buffer 31 can be set to any suitable value as long as it is larger than the value of the characteristic impedance of the transmission line, but if it is set to too large a value, the output amplitude decreases, and the intended signal processing cannot be performed; therefore, an optimum value in terms of circuit design should be adopted.

The driver of the present embodiment has been described as comprising three buffers, but the present invention is effective if the output circuit includes at least one control buffer for the basic buffer.

What is claimed is:

1. A circuit board mounted with a plurality of circuit components connected via a transmission line, wherein the circuit components include at least
    a signal processing unit to process a signal;
    a driver unit to transmit the signal; and
    a receiver unit to receive the signal,
    wherein the driver unit includes
        a basic buffer which is always on and an output impedance of the basic buffer is set higher than a characteristic impedance of the transmission line,
        at least one control buffer which can be individually controlled on and off and which is connected in parallel with the basic buffer,
        a delay circuit block to obtain a delayed signal by delaying an input signal, and
        a control circuit to generate a control signal for the control buffer by comparing the delayed signal with the input signal, and
    wherein the control buffer is controlled based on the generated control signal.

2. A circuit board, as described in claim 1, wherein the receiver unit has a termination resistance whose value is higher than the characteristic impedance of the transmission line.

3. The circuit board as described in claim 1,
    wherein the driver unit includes
        at least two control buffers,
        a delay circuit block to obtain a first delayed signal by delaying the input signal by one cycle, a delay circuit block to obtain a second delayed signal by delaying the input signal by two cycles, a first control circuit to generate a first control signal for the control buffers by comparing the input signal with the first delayed signal, and a second control circuit to generate a second control signal for the control buffers by comparing the input signal with the second delayed signal, and wherein one of the control buffers is controlled based on the first control signal, and another one of the control buffers is controlled based on the second control signal.

4. An information processing apparatus comprising at least one circuit board mounted with a plurality of circuit components connected via a transmission line, wherein the circuit components include a signal processing unit to process a signal;

a driver unit to transmit the signal; and a receiver unit to receive the signal, and wherein the driver unit includes a basic buffer which is always on and an output impedance of the basic buffer is set higher than a characteristic impedance of the transmission line, at least one control buffer which can be individually controlled on and off and which is connected in parallel with the basic buffer, a delay circuit block to obtain a delayed signal by delaying an input signal, and a control circuit to generate a control signal for the control buffer by comparing the delayed signal with the input signal, and wherein the control buffer is controlled based on the generated control signal.

5. An information processing apparatus, as described in claim 4, wherein the receiver unit has a termination resistance whose value is higher than the characteristic impedance of the transmission line.

6. The information processing apparatus as described in claim 4, wherein the driver unit includes at least two control buffers, a delay circuit block to obtain a first delayed signal by delaying the input signal by one cycle, a delay circuit block to obtain a second delayed signal by delaying the input signal by two cycles, a first control circuit to generate a first control signal for the control buffers by comparing the input signal with the first delayed signal, and a second control circuit to generate a second control signal for the control buffers by comparing the input signal with the second delayed signal, and wherein one of the control buffers is controlled based on the first control signal, and another one of the control buffers is controlled based on the second control signal.

7. A method of transmission between a driver circuit and a receiver circuit, which receives an output signal of the driver circuit via a transmission line, the driver circuit comprising a basic buffer, which is always on and at least one control buffer which can be individually controlled on and off and which is connected in parallel with the basic buffer, comprising:

setting an output impedance of the basic buffer higher than a characteristic impedance of the transmission line via which the output signal of the driver circuit is transmitted, generating a delayed signal by delaying an input signal to the driver circuit, comparing the delayed signal with the input signal, controlling the control buffer based on the result of the comparison, and generating an output signal of the driver circuit and transmitting the output signal to the receiver circuit, wherein the receiver unit has a termination resistance whose value is higher than the characteristic impedance of the transmission line.

\* \* \* \* \*